(12) United States Patent
Trossen et al.

(10) Patent No.: US 8,856,240 B2
(45) Date of Patent: Oct. 7, 2014

(54) METHOD, SYSTEM AND COMPUTER PROGRAM TO PROVIDE SUPPORT FOR SPORADIC RESOURCE AVAILABILITY IN SIP EVENT ENVIRONMENTS

(75) Inventors: Dirk Trossen, Cambridge, MA (US); Dana Pavel, Cambridge, MA (US)

(73) Assignee: Nokia Corporation, Espoo (FI)

( * ) Notice: Subject to any disclaimer, the term of this patent is extended or adjusted under 35 U.S.C. 154(b) by 2104 days.

(21) Appl. No.: 10/875,136

(22) Filed: Jun. 23, 2004

(65) Prior Publication Data

US 2006/0013233 A1 Jan. 19, 2006

(51) Int. Cl.
*G06F 15/16* (2006.01)

(52) U.S. Cl.
USPC ........................................ 709/206

(58) Field of Classification Search
USPC .................................. 709/203, 223
See application file for complete search history.

(56) References Cited

U.S. PATENT DOCUMENTS

| | | | | |
|---|---|---|---|---|
| 6,775,658 | B1 * | 8/2004 | Zothner ........................ | 706/47 |
| 7,272,660 | B1 * | 9/2007 | Powers et al. ................ | 709/238 |
| 7,293,271 | B2 | 11/2007 | Trossen et al. ............... | 719/318 |
| 8,046,476 | B2 | 10/2011 | Trossen et al. ............... | 709/229 |
| 2002/0198747 | A1 * | 12/2002 | Boyer et al. .................. | 705/5 |
| 2003/0040280 | A1 * | 2/2003 | Koskelainen ............... | 455/67.1 |
| 2003/0048195 | A1 * | 3/2003 | Trossen ................... | 340/825.49 |
| 2004/0003058 | A1 | 1/2004 | Trossen ....................... | 709/220 |
| 2004/0128344 | A1 | 7/2004 | Trossen ....................... | 709/227 |
| 2004/0153547 | A1 | 8/2004 | Trossen ....................... | 709/228 |
| 2004/0153552 | A1 | 8/2004 | Trossen et al. ............... | 709/229 |
| 2004/0260749 | A1 | 12/2004 | Trossen et al. ............... | 709/200 |
| 2005/0108747 | A1 * | 5/2005 | Omoigui ....................... | 725/32 |
| 2005/0289097 | A1 | 12/2005 | Trossen et al. ............... | 707/1 |
| 2006/0080428 | A1 | 4/2006 | Trossen et al. ............... | 709/224 |
| 2010/0205298 | A1 | 8/2010 | Trossen et al. ............... | 709/224 |

OTHER PUBLICATIONS

"A Presence Event Package for the Session Initiation Protocol (SIP)", J. Rosenberg, IETF Draft, Jan. 2003, pp. 1-24.
"SIP: Session Initiation Protocol", J. Rosenberg, et al., AT&T, Jun. 2002, pp. 1-236.
"Session Initiation Protocol (SIP)-Specific Event Notification", A. B. Roach, Network Working Group, Jun. 2002, pp. 1-34.
A Watcher Information Event Template-Package for the Session Initiation Protocol (SIP), J. Rosenberg, SIMPLE WG, Jan. 31, 2003, pp. 1-18.
M. Handley, V. Jacobson, "SDP: Session Description Protocol", RFC 2327, Apr. 1998 (40 pages).
Campbell, B., "SIMPLE Presence Publication Mechanism", Work in Progress, IETF Draft, Jun. 2002 (21 pages).
D. Trossen, D. Pavel, "Enabling Semantic Mediation for SIP Events Through Support of Dynamically Binding to and Changing of Application Semantics of SIP Events", NC34915, Jan. 2004.
IETF RFC 3261 (252 pages), Aug. 20, 2012.

* cited by examiner

*Primary Examiner* — Sulaiman Nooristany
(74) *Attorney, Agent, or Firm* — Harrington & Smith

(57) ABSTRACT

Disclosed is an event notification system and a method to operate an event notification system that has servers and a subscriber unit. The method includes associating with a particular event subscription an "available" event template subscription; sending an initial notify message to the subscriber unit with a current availability of an event state of the event subscription and, for the duration of the particular event subscription, upon detecting a change in the availability of the event state sending an "available" event template notification to the subscriber unit from the event server for informing the subscriber unit of the change in the availability of the event state. The change can be from available to unavailable, or from unavailable to available.

38 Claims, 2 Drawing Sheets

METHOD, SYSTEM AND COMPUTER PROGRAM TO PROVIDE SUPPORT FOR SPORADIC RESOURCE AVAILABILITY IN SIP EVENT ENVIRONMENTS

CROSS-REFERENCE TO RELATED PATENT APPLICATIONS:

This patent application is related to the following commonly assigned U.S. Patent Applications: D. Trossen, "Integration of Service Registration and Discovery in Networks", Ser. No. 10/179,244, filed Jun. 26, 2002; D. Trossen, "Content and Service Registration, Query, and Notification using SIP Event Packages", Ser. No. 10/330,146, filed Dec. 30, 2002; D. Trossen, K. Mehta, "Access Control Alert Method using SIP Event Package", Ser. No. 10/353.014, filed Jan. 29, 2003; D. Trossen, "Querying for SIP Event Packages by Using SIP OPTIONS Method or by Using Service Discovery", Ser. No. 10/418,313, filed Apr. 18, 2003; D. Trossen, D. Pavel, "Application Semantic Binding through SIP Event Package Template", Ser. No. 10/465,455, filed Jun. 19, 2003; to U.S. patent application Ser. No. 10/874,946, filed Jun. 23, 2004, "Method, System and Computer Program to Enable Querying of Resources in a Certain Context by Definition of SIP Event Package", by Dirk Trossen and Dana Pavel; and to U.S. patent application Ser. No. 10/862,868, filed Jun. 7, 2004, "Method, System and Computer Program to Enable Semantic Mediation for Sip Events Through Support of Dynamically Binding to and Changing of Application Semantics of Sip Events", by Dirk Trossen and Dana Pavel, the disclosures of which are incorporated by reference in their entireties.

TECHNICAL FIELD

This invention relates generally to wireless communications systems and methods and, more specifically, relates to wireless terminals and wireless network nodes that use a Session Initiation Protocol (SIP).

BACKGROUND

The infrastructure of the Session Initiation Protocol (SIP) is defined in IETF RFC 3261 (Rosenberg et al., June 2002). In general, the SIP is an application-layer control (signaling) protocol for creating, modifying and terminating sessions with one or more participants. The sessions can include Internet telephone calls, multimedia distribution and multimedia conferences. SIP invitations used to create sessions carry session descriptions that allow participants to agree on a set of compatible media types. SIP makes use of elements called proxy servers to help route requests to the user's current location, authenticate and authorize users for services, implement provider call-routing policies and provide features to users. SIP also provides a registration function that allows users to upload their current locations for use by proxy servers. SIP runs on top of several different transport protocols.

In "SIP-Specific Event Notification", A. Roach, RFC 3265, July 2002 (referred to hereafter simply as RFC 3265), there is described a SIP event framework to enable event-based information provisioning to any node in the Internet. This procedure is expected to become a key element within the SIP infrastructure. Examples of this kind of information are presence, location information, content/service availability, or access-controlled SIP events.

As is discussed in RFC 3265, the general concept is that entities in the network can subscribe to resource or call state for various resources or calls in the network, and those entities (or entities acting on their behalf) can send notifications when those states change. A typical flow of messages would be:

| Subscriber | Notifier |
|---|---|
| \|-----SUBSCRIBE---->\| | Request state subscription |
| \|<--------200--------------\| | Acknowledge subscription |
| \|<------NOTIFY---------\| | Return current state information |
| \|---------200------------->\| | Acknowledge |
| \|<------NOTIFY--------\| | Return current state information |
| \|---------200------------->\| | Acknowledge |

Subscriptions are expired and must be refreshed by subsequent SUBSCRIBE messages.

Several useful definitions include the following:

Event Package: An event package is an additional specification which defines a set of state information to be reported by a notifier to a subscriber. Event packages also define further syntax and semantics based on the framework defined by RFC 3265 that are required to convey such state information.

Event Template-Package: An event template-package is a special kind of event package which defines a set of states which may be applied to all possible event packages, including itself.

Notification: Notification is the act of a notifier sending a NOTIFY message to a subscriber to inform the subscriber of the state of a resource.

Notifier: A notifier is a user agent which generates NOTIFY requests for the purpose of notifying subscribers of the state of a resource. Notifiers typically also accept SUBSCRIBE requests to create subscriptions.

State Agent: A state agent is a notifier which publishes state information on behalf of a resource; in order to do so, it may need to gather such state information from multiple sources. State agents always have complete state information for the resource for which they are creating notifications.

Subscriber: A subscriber is a user agent which receives NOTIFY requests from notifiers; these NOTIFY requests contain information about the state of a resource in which the subscriber is interested. Subscribers typically also generate SUBSCRIBE requests and send them to notifiers to create subscriptions.

Subscription: A subscription is a set of application state associated with a dialog. This application state includes a pointer to the associated dialog, the event package name, and possibly an identification token. Event packages will define additional subscription state information. By definition, subscriptions exist in both a subscriber and a notifier.

Subscription Migration: Subscription migration is the act of moving a subscription from one notifier to another notifier.

The SUBSCRIBE method is used to request current state and state updates from a remote node.

J. Rosenberg has defined in "A Watcher Information Event Template-Package for the Session Initiation Protocol (SIP)", draft-ietf-simple-winfo-package-05.txt, Jan. 31, 2003, a watcher information template-package for the SIP event framework. Watcher information in this context refers to a set of users that are subscribed to a particular resource within a particular event package. Watcher information changes dynamically as users subscribe, unsubscribe, are approved, or are rejected. A user can subscribe to this information, and therefore can learn of changes to this information. This particular event package is referred to as a template-package, as it can be applied to any event package, including itself.

As was noted above, the SIP event framework defined in RFC 3265 is intended to enable event-based information provisioning to any node in the Internet. SIP events are used to provide a notification scheme that allows for conveying state changes of a particular resource, or changes of aggregated states relating to a pool of resources, to subscribers for the state information. Examples for this kind of information are presence (see J. Rosenberg, "A Presence Event Package for the Session Initiation Protocol (SIP)", Internet Draft, Internet Engineering Task Force, (work in progress), January 2003), location information or content/service availability (see, for example, US 2004/0003058 A1, D. Trossen, "Integration of Service Registration and Discovery in Networks", Ser. No. 10/179,244, filed Jun. 26, 2002). In these cases the resource is the presentity, the location information or the content/service information, and changes to these resources are conveyed to subscribers as event notifications.

In scenarios for using SIP events, it is usually assumed that the SIP event server, i.e., the server hosting the event state, is aware of the resource information in order to determine the state information. For example, a presence server is assumed to be aware of the presence information of the presentities in order to determine the current presence status. If such presentity information is unknown, however, the presence status is assumed as being "not present"(see, again, J. Rosenberg, "A Presence Event Package for the Session Initiation Protocol (SIP)", Internet Draft, Internet Engineering Task Force, (work in progress), January 2003)).

However, there maybe cases in which the resource information for determining the event state is only sporadically available at the SIP event server, leading to a temporary unavailability of the event state as such, and thus defining the event state as "undetermined" during these periods. Consider in this regard the following exemplary use cases.

As a first use case (Group Presence) assume a subscription to a group presence (for example, a group of mothers) expressed as a group URI such as "pres:soccermom1234@service_provider.com". The group presence is determined at the service_provider presence server through individually subscribing to the presence of each group member. The notifications to the subscriber would indicate the presence of the entire group (i.e., the group is present if all members are present), which could be used to initiate certain group services (such as chat). However, it may occur that during the subscription to the group, individual presence information becomes unavailable, such as due to a failure of individual presence servers. In this case no notifications would be sent to the subscriber, since the "present" status cannot be determined during this "blackout" period due to the partially missing, individual presence information.

As a second use case (Context Information) one may generalize the Group Presence use case. For this purpose consider the provisioning of any context information (such as presence, location, but also sensor-based information) through SIP events as, for example, is described in commonly assigned U.S. patent application Ser. No. 10/862,868, filed Jun. 7, 2004, "Method, System and Computer Program to Enable Semantic Mediation for Sip Events Through Support of Dynamically Binding to and Changing of Application Semantics of Sip Events", by Dirk Trossen and Dana Pavel. At the time of subscription, the particular SIP event server accepts the subscription since the resources for determining the desired event state are generally available at the server. However, throughout the subscription, some of the resource information (for example, certain remote sensors) may become temporarily unavailable so that the subscribed event state cannot be determined during this time. As a consequence, the subscriber would not receive any notification throughout the temporary "blackout". However, it is possible that the subscribed state indeed did change throughout this "blackout", it could simply not be determined by the SIP event server due to the unavailability of the required input information.

As an example consider a subscription to context information that requires location information as one input parameter. However, the location information may become temporarily unavailable during the subscription (e.g., because of shadowing effects in the location determination) so that the entire context information for the subscription cannot be determined temporarily.

In both of the foregoing use cases it would be desirable if there existed a technique to convey the temporary unavailability of resource information (and therefore the inability to determine the event state) to the subscriber. The reason for this is that there is a semantic distinction between not receiving notifications because the subscribed event state has not changed (e.g., in the above context provisioning use case, the desired context has not been triggered), or because the subscribed event state could not be determined at least temporarily. In other words, as currently specified in a SIP event environment the subscriber cannot easily differentiate between a "no change in event state" condition or a "temporary unavailability of input information" condition.

Within the current SIP event framework, the described use cases related to the problem of sporadic availability of required input information are solved by either terminating the particular subscription from the event server's side (therefore indicating the unavailability of the resource input) or by sending event-specific notifications to the subscriber that would indicate such unavailability.

However, the former conventional approach leads to problems when the unavailability of resource input occurs frequently throughout the lifetime of the application that subscribes to the resource. As a consequence, the subscription terminations result in frequent re-subscription and terminations each time the resource input becomes temporarily unavailable. Such frequent subscriptions/terminations place an undesirable burden on both the subscriber and the SIP event server.

The latter conventional approach, i.e., event-specific notifications, is by definition event-specific and therefore requires proper integration into the semantics of any event that is subject to temporary unavailability of input information. However, even in this case the conveyance of the unavailability-related information in principle violates the paradigm of the subscription in the sense that instead of conveying event state information, the notifications are instead used for making availability notifications (which carry a different semantic). It is important to note in this regard that the subscriber subscribes to the event state as such, and not to the availability of the input information (in particular, because the subscriber may not be aware of what input information is used by the event server for making the event state determination). In other words, even though the event state may not have changed, the notifications are used to convey information, which is not related to the event state as such, back to the subscriber. This can be readily seen as an improper usage of the original (event state) subscription.

A need thus exists to provide a mechanism for a SIP event server to convey an occurrence of a temporary unavailability of input information, and to do so while maintaining the original subscription dialog through usage of an event template package that is associated with the particular event package of the original subscription. It would also be desirable to perform this function without the need of frequently terminating and re-establishing subscriptions for events that require input from sporadically available sources. Prior to this invention, such a mechanism did not exist.

SUMMARY OF THE PREFERRED EMBODIMENTS

The foregoing and other problems are overcome, and other advantages are realized, in accordance with the presently preferred embodiments of these teachings.

This invention solves the foregoing and other problems by providing an event template package that signals to a subscriber the temporary unavailability of input information. Based on this information the subscriber is enabled to take appropriate actions, such as terminating the entire subscription, or adapting the use of the information due to the sporadic character of the event state determination.

In one aspect this invention provides a method to operate an event notification system having an event server and a subscriber unit. The method includes associating with a particular event subscription an "available" event template subscription; sending an initial notify message to the subscriber unit with a current availability of an event state of the event subscription and, for the duration of the particular event subscription, upon detecting a change in the availability of the event state sending an "available" event template notification to the subscriber unit from the event server for informing the subscriber unit of the change in the availability of the event state. The change can be from available to unavailable, or from unavailable to available.

In a further aspect this invention provides an event notification system having a server and a subscriber unit coupled to a data communications network. The subscriber unit has logic to send, associated with a particular event subscription, an "available" event template subscription, and the event server has logic to send an initial notify message to the subscriber unit with a current availability of an event state of the event subscription. The event server logic is operable, for a duration of the particular event subscription, to respond to detecting a change in the availability of the event state to send an "available" event template notification to the subscriber unit for informing the subscriber unit of the change in the availability of the event state.

In a still further aspect this invention provides a subscriber unit operable in an event notification system having an event server coupled to a data communications network. The subscriber unit includes logic to send, in association with a particular event subscription, an "available" event template subscription to the event server, and to receive from the event server an initial notify message having a current availability of an event state of the particular event subscription. For a duration of the particular event subscription, and in response to the event server detecting a change in the availability of the event state, the subscriber unit is also operable to receive an "available" event template notification from the event server that informs the subscriber unit of the change in the availability of the event state.

In another aspect this invention provides an event server operable in an event notification system that includes a subscriber unit coupled to a data communications network. The event server has logic that is responsive to a receipt, in association with a particular event subscription, of an "available" event template subscription from the subscriber unit to send to the subscriber unit an initial notify message having a current availability of an event state of the particular event subscription. The event server logic is further operable, for a duration of the particular event subscription, to respond to detecting a change in the availability of the event state to send an "available" event template notification that informs the subscriber unit of the change in the availability of the event state.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
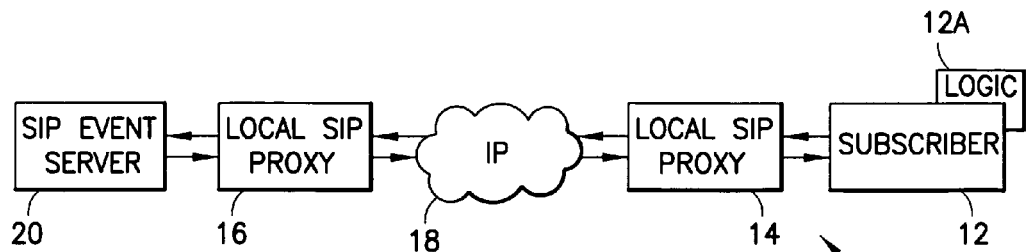
FIG. 1 shows the overall architecture and major logical entities of the present invention.

The presently preferred embodiment of this invention describes the system and method in the overall context of the SIP event framework, as defined by RFC 3265. Hence, the operation of the event server and subscriber unit described below with respect to FIG. 1 is based on the SIP event framework. However, the use of the SIP event framework is not to be construed as a limitation upon the practice of this invention.

In a most presently preferred embodiment this invention employs SIP event environments in which the resources that are associated with SIP event states are only sporadically available, i.e., the event state as such is only sporadically available.

Referring to FIG. 1 there is shown a simplified architectural diagram of a system 10 that is suitable for practicing this invention. The system 10 includes a subscriber 12, local SIP proxies 14 and 16, a network such as an Internet Protocol (IP) network 18 and a SIP event server 20.

In the presently preferred, but non-limiting embodiment of this invention the subscriber 12 is associated with a mobile wireless communications device, such as a cellular telephone, or a personal communicator, or a mobile user or agent such as a computer that is coupled to the network 18 via a wireless link. The network 18 can comprise the Internet.

The subscriber 12 includes logic 12A and is assumed to desire to subscribe to the availability of services or content, as described in further detail below.

The SIP proxies 14 and 16 typically exist for the subscriber 12 as well as for the SIP event server 20, and are responsible for the handling of SIP messages and appropriately forwarding the SIP messages to the specified entity. Note that the SIP proxies 14 and 16 represent a non-limiting embodiment of an entity that provides forwarding of registration, subscription, and notifications, as provided by the SIP event framework specified by RFC 3265. However, other mechanisms could be used as well in other embodiments of this invention. Thus, while the SIP proxies 14, 16 are a presently preferred embodiment, their use should not be construed as a limitation upon the implementation and practice of this invention.

The various logic units, functions and modules 12A and 20A-20C can be constructed using hardware, software or a combination of hardware and software. In some cases the logic units, functions and modules 12A and 20A-20C can be implemented in whole or in part with computer program code that is locally stored and executed by data processors that comprise the subscriber unit 12 and the SIP event server 20.

A presently preferred embodiment of this invention defines a SIP event package template that is referred to for convenience, and not by way of limitation, as "available", with no event header field. The absence of the event header field happens to be similar to the watcherinfo template described by J. Rosenberg in the above-referenced "A Watcher Information Event Template-Package for the Session Initiation Protocol (SIP)", draft-ietf-simple-winfo-package-05.txt, Jan. 31, 2003. The "available" template package is bound to a particular event subscription similar to the watcherinfo template package, that is, the subscription carries sufficient information as to what existing SIP event dialog the template is to be bound to.

If the particular SIP event package supports the "available" template package, and if the particular event subscription exists, the SIP event server 20 responds to the event template subscription with a "200 OK". Otherwise, an appropriate error code is returned.

The initial and all subsequent notifications for the "available" event template indicate either the availability of all necessary input information to determine a proper event state for the event subscription, or the notification indicates the temporary unavailability of at least one piece of input information. With this mechanism the notification signals the temporary inability of the SIP event server 20 to determine the event state due to the unavailability of required input information. Additionally, the body of the notification may include information about the temporarily unavailable input information, and it may further include information regarding the estimated duration of the unavailability, if this functionality is supported by the SIP event server 20.

Upon reception of the "available" event template notification the subscriber 12 may implement various methods to react to the temporary unavailability of required input information. As one non-limiting example, the subscriber 12 may tear down the event subscription itself (if the temporary unavailability would deem the subscription useless), or it may just display a warning to the user to make the user aware of the temporary unavailability of required input information.

In FIG. 1 it is assumed that the subscriber 12 desires to subscribe to a particular SIP event and, in accordance with this invention, it can be further assumed that the subscriber 12 further desires to subscribe to the availability of input information for the SIP event.

Figure 3:
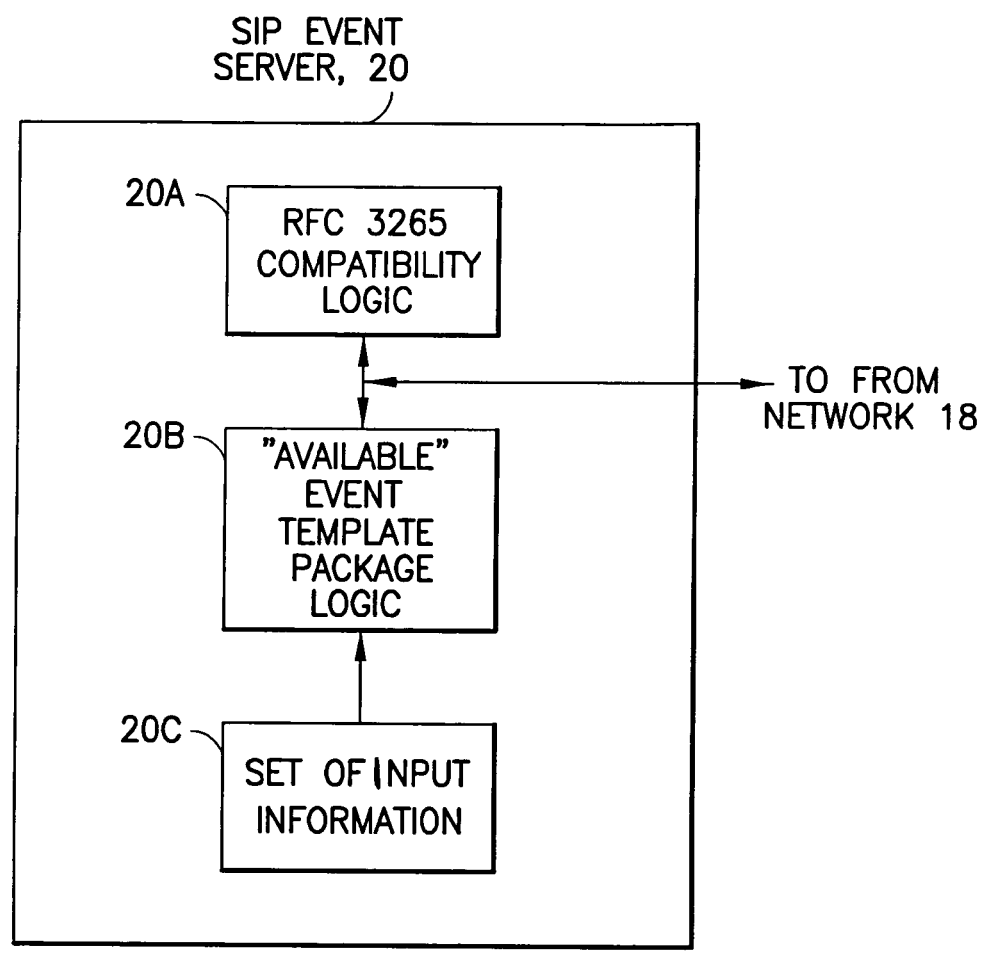
FIG. 3 shows a block diagram of a presently preferred embodiment of the SIP event server of FIG. 1.

Referring also to FIG. 3, the SIP event server 20 implements SIP events, compliant with RFC 3265. In order to implement the present invention, the SIP event server 20 includes, apart from logic 20A that provides functionality compliant with RFC 3265, logic 20B that provides support for the "available" event template package. Thus, the SIP event server 20 has the ability to provide notifications of the availability of input information required to determine a specific event state. To this end the SIP event server 20 is also assumed to include, or at least have access to, a set of input information 20C used to determine the specific input state.

The semantics of the "available" event template package are as follows. The subscription assigns the event template to a particular SIP event dialog, e.g., through specifying the event name and event-specific information (such as presentity in the presence case). Other examples for such assignment are the inclusion of the SIP dialog identifier (see J. Rosenberg et al., "SIP: Session Initiation Protocol", RFC 3261, July 2002) in the event template subscription. However, it should be appreciated that the exact nature of how the assignment is described is outside the scope of this invention, and may be subject to an agreed-upon standardization of the "available" event template package by standardization bodies.

The notification is sent by the SIP event server 20 if the ability to determine the associated event state changed, where it is assumed that the ability to determine the change in the associated event state depends on the availability of the required input information. In accordance with this invention if at least one member of the set of input information 20C becomes unavailable and, therefore, the event state cannot be determined (temporarily), the logic 20B associated with the "available" event template triggers an appropriate notification to the subscriber 12. If all input information again becomes available, another notification is triggered to the subscriber 12 indicating the ability of the SIP event server 20 to once again determine the event state.

The body of each notification may include the following information:

a) an indication about the ability of determining the event state;
b) in the case of unavailability of the input information, information that is descriptive of which missing input information is causing the temporary inability to determine the event state; and/or
c) in the case of unavailability of the input information, an estimate of when certain input information is expected to become available once again.

It should be noted that the exact nature of how the body of the notification is constructed is outside the scope of this invention, and may be subject to an agreed-upon standardization by standardization bodies. However, the Extended Markup Language (XML) is one suitable candidate for implementing the notification body.

Figure 2:
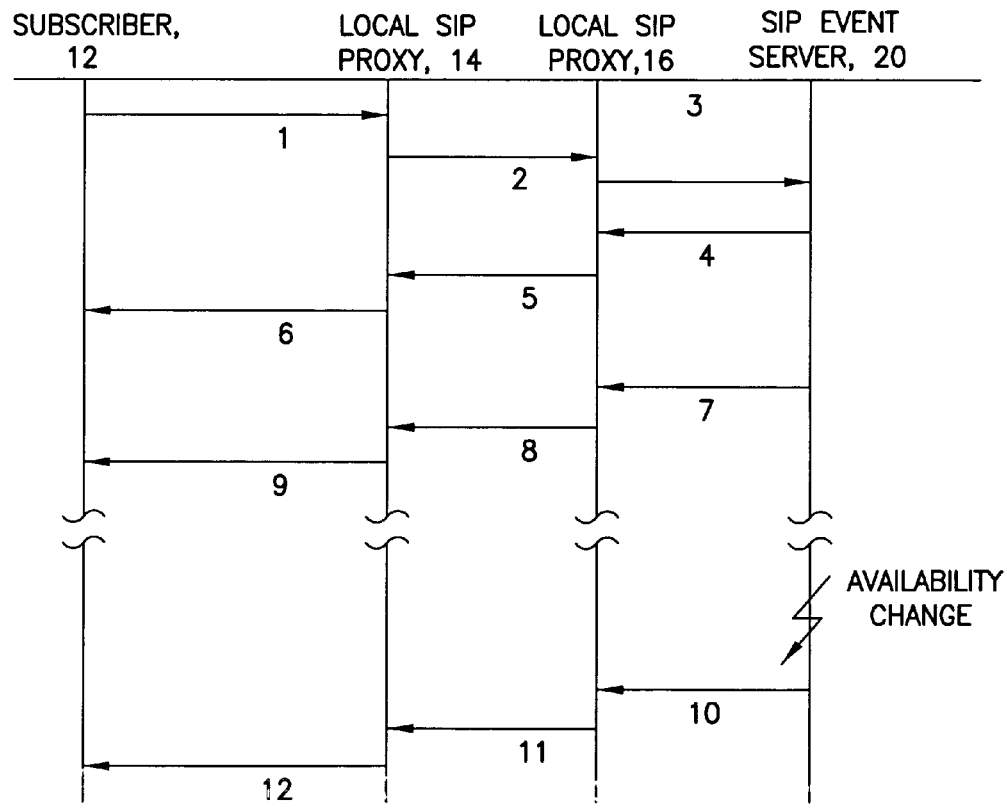
FIG. 2 illustrates various process steps and messages in accordance with the invention.

FIG. 2 shows the steps and messages that are used for subscribing to the availability of the event state in accordance with this invention. It is assumed in the following discussion that there exists a particular SIP event subscription, referred to for convenience as 'foo' in the following discussion, which is intended to be associated to the "available" event template defined above.

After subscription to the event 'foo', the subscriber 12 sends a SUBSCRIBE (message 1 in FIG. 2, routed via the SIP proxies 14, 16 as message 3 to the SIP event server 20) to the event template "available" that is associated with the logic 20B shown in FIG. 3. The body of the subscription is assumed to include appropriate information to enable the SIP event server 20 to associate the "available" event template subscription to the 'foo' event subscription.

If the 'foo' event package implementation supports the "available" event template package, and the indicated subscription does exist, the SIP event server 20 responds with a '200 OK' (message 4 in FIG. 2, routed via the SIP proxies 14, 16 as message 6 to the subscriber 12). Otherwise, an appropriate error code, compliant with RFC 3265, is returned to the subscriber 12.

Compliant with RFC 3265 the SIP event server 20 sends an initial NOTIFY (message 7 in FIG. 2, routed via the SIP proxies 14, 16 as message 9 to the subscriber 12) with the current availability of the 'foo' event state. The body of this notification may include information as described in the "available" event template package definition above.

Throughout the duration of the subscription the availability of the 'foo' event state may change, triggering an "available" event template NOTIFY to be sent (shown as message 10 in FIG. 2, routed via the SIP proxies 14, 16 as message 12 to the subscriber 12). As was discussed above in reference to the "available" event template package definition, the body of the notification includes information about the current availability of the 'foo' event state (i.e., available or unavailable).

If the availability of the state has changed from 'available' to 'unavailable', the body may further include the information as described above, such as information that specifies the at least one unavailable input information and/or an estimation of the duration of the unavailability period for the at least one unavailable input information.

Upon reception of the "available" event template notification (message 12 in FIG. 2), the subscriber unit 12 may choose to use the availability information for internal purposes. For example, based on the estimation of the duration of the unavailability (if included in the body of the notification message), the subscriber unit 12 may decide to terminate the 'foo' event subscription as the estimated duration of the unavailability would render the subscription useless for its intended purpose. The duration of the unavailability might also be used to decide whether to acquire alternative input information that would allow for compensating for the unavailability of the 'foo' event state.

For example, if the particular SIP event subscription 'foo' required a determination of the location of another subscriber, and if the location was specified in the subscription to be determined by a GPS procedure, and if the GPS system is for some reason temporarily unavailable, the subscriber unit 12 user may have the opportunity to specify instead some other, available location determination procedure, such as cell location. Without the use of this invention, and if the GPS location determination was temporarily unavailable, the subscriber 12 may not be notified of any change of state at all related to the event subscription, simply because some element of the required information was not available. Alternatively, the subscriber 12 might be notified of the unavailability-related information in such a manner that, in principle, violated the paradigm of the subscription, in the sense that instead of conveying event state information, the notification is instead used for making availability notifications. The use of this invention thus beneficially avoids both of these problems.

The subscriber unit 12 could instead simply display a warning to the user that certain input information is not available, and that the application is not able to perform certain functionality. It should be realized, however, that in general the usage of the "available"event template notification (message 12 in FIG. 2) is outside of the scope of this invention.

Based on the foregoing description it can be appreciated that one advantage that is realized by the use of this invention is that it allows for conveying temporary unavailability of input information that is required for determining SIP event states. This allows for properly differentiating at the subscriber unit 12 whether outstanding notifications for an event subscription are caused due to non-changes in the event state, or are due to an inability to properly determine any state (since at least one input information required for the state determination is not available).

Due to the use of the "available" event template package that is bound to the particular event subscription, the invention allows for the notification of unavailability to take place within an existing event subscription dialog. Hence, it is the responsibility of the subscriber 12 to decide whether to terminate the event subscription due to the temporary unavailability of state information. This beneficially removes the burden from the subscriber 12 and the SIP event server 20 to use frequent subscriptions/terminations for the case of sporadic unavailability.

Further, the conveyance of the indication of temporary unavailability is realized independent of the particular event package, hence no event package specific solutions are required. With this, the solution properly integrates into the SIP event framework through the use of the "available" event template package.

The invention further allows for conveying information to the subscriber 12 about the unavailable input information, and possibly as well an estimation of the duration of the unavailability.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent message type and formats, resources and network architectures, may be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method, comprising:
   associating an event template subscription with a particular event subscription, the event template subscription and the particular event subscription both being subscribed to by a same subscriber unit, the event template subscription configured to cause, at least in part, providing a notification to the subscriber unit of availability of input information needed to determine an event state for the particular event subscription;
   causing, at least in part, transmission of an initial notify message to the subscriber unit with a current availability of the input information; and
   for a duration of the particular event subscription, upon detecting a change in availability of the input information, causing, at least in part, transmission of an event template notification to the subscriber unit for informing the subscriber unit of the change in the availability of the input information.

2. A method as in claim 1, wherein the change is from available to unavailable.

3. A method as in claim 1, wherein the change is from unavailable to available.

4. A method as in claim 1, wherein the event template notification comprises information that is descriptive of unavailable input information.

5. A method as in claim 1, wherein the event template notification comprises information that is descriptive of a duration that input information will be unavailable.

6. A method as in claim 1, further comprising, in response to causing, at least in part, transmission of the event template notification, terminating the particular event subscription based on a request of the subscriber unit.

7. A method as in claim 4, further comprising, in response to causing, at least in part, transmission of the event template notification, receiving an indication of available input information selected by the subscriber unit to compensate for the unavailable input information.

8. A method as in claim 1, wherein the event template subscription is configured to cause, at least in part, an event server to provide the notification and the event server comprises a Session Initiation Protocol (SIP) event server.

9. A method as in claim 8, wherein the event template subscription is received from the subscriber unit via at least one SIP proxy.

10. An apparatus, comprising:
at least one processor; and
at least one memory including computer program code,
the at least one memory and the computer program code configured to, with the at least one processor, cause the apparatus to perform at least the following,
associate an event template subscription with a particular event subscription, both the event template subscription and the particular event subscription being subscribed to by a same subscriber unit, the event template subscription comprising a request to provide a notification to the subscriber unit of availability of input information needed to determine an event state for the particular event subscription;
cause, at least in part, transmission of an initial notify message to the subscriber unit via the data communications network with a current availability of the input information; and
for a duration of the particular event subscription, in response to detecting a change in availability of the input information, cause, at least in part, transmission of an event template notification to the subscriber unit via the data communications network to inform the subscriber unit of the change in the availability of the input information.

11. An apparatus as in claim 10, wherein the change is from available to unavailable.

12. An apparatus as in claim 10, wherein the change is from unavailable to available.

13. An apparatus as in claim 10, wherein the event template notification comprises information that is descriptive of unavailable input information.

14. An apparatus as in claim 10, wherein the event template notification comprises information that is descriptive of a duration that input information will be unavailable.

15. An apparatus as in claim 10, wherein the apparatus is further caused, at least in part, to:
in response to causing, at least in part, transmission of the event template notification, terminate the particular event subscription based on a request of the subscriber unit.

16. An apparatus as in claim 13, wherein the apparatus is further caused, at least in part, to:
in response to causing, at least in part, transmission of the event template notification, receive an indication of available input information selected by the subscriber unit to compensate for the unavailable input information.

17. An apparatus as in claim 10, wherein the apparatus is embodied as a part of a Session Initiation Protocol (SIP) event server.

18. An apparatus as in claim 17, wherein the event template subscription is received from the subscriber unit via at least one SIP proxy.

19. An apparatus, comprising:
at least one processor; and
at least one memory including computer program code,
the at least one memory and the computer program code configured to, with the at least one processor, cause the apparatus to perform at least the following,
cause, at least in part, transmission of an event template subscription, in association with a particular event subscription;
receive an initial notify message indicating availability of input information needed to determine an event state for the particular event subscription; and
for a duration of the particular event subscription, receive an event template notification indicating a change in the availability of the input information.

20. An apparatus as in claim 19, wherein the change is from available to unavailable.

21. An apparatus as in claim 19, wherein the change is from unavailable to available.

22. An apparatus as in claim 19, wherein the event template notification comprises information that is descriptive of unavailable input information.

23. An apparatus as in claim 19, wherein the event template notification comprises information that is descriptive of a duration that input information will be unavailable.

24. An apparatus as in claim 19, wherein the apparatus is further caused, at least in part, to:
in response to receiving the event template notification, terminate the particular event subscription.

25. An apparatus as in claim 19, wherein the apparatus is further caused, at least in part, to:
in response to receiving the event template notification, notify a user of the change of availability of the input information.

26. An apparatus as in claim 22, wherein the apparatus is further caused, at least in part, to:
in response to receiving the event template notification, select available input information to compensate for the unavailable input information.

27. An apparatus as in claim 19, wherein the apparatus is configured to operate with a Session Initiation Protocol (SIP) event server.

28. An apparatus as in claim 19, wherein the apparatus is embodied as a mobile wireless communications device.

29. A method, comprising:
establishing an event subscription and an associated event package template with an event server;
receiving from the event server an initial notify message indicating availability of input information needed to determine an event state for the event subscription; and
in response to a change in availability of the input information, receiving an event template notification from the event server indicating the change in the availability of the input information.

30. The method as in claim 29, wherein the change is one of from available to unavailable or unavailable to available.

31. The method as in claim 30, wherein the event template notification comprises information that is descriptive of unavailable input information.

32. The method as in claim 29, further comprising, in response to receiving the event template notification, notifying a user of the change of availability of the input information.

33. The method as in claim 30, further comprising, in response to receiving the event template notification indicating the change from available to unavailable, allowing, at least in part, selection of other input information to compensate for unavailable input information.

34. The method as in claim 29, the method being executed in a mobile wireless device that is configured for operation with a Session Initiation Protocol (SIP) event server.

35. The method as in claim 30, wherein the event template notification comprises information that is descriptive of a duration that input information will be unavailable.

36. The method as in claim 30, further comprising, in response to receiving the event template notification indicating the change from available to unavailable, terminating the event subscription.

37. A computer-readable storage medium carrying one or more sequences of one or more instructions which, when executed by one or more processors, cause an apparatus to at least perform the following steps:

associating an event template subscription with a particular event subscription, the event template subscription and the particular event subscription both being subscribed to by a same subscriber unit, the event template subscription configured to cause, at least in part, providing a notification to the subscriber unit of availability of input information needed to determine an event state for the particular event subscription;

causing, at least in part, transmission of an initial notify message to the subscriber unit with a current availability of the input information; and for a duration of the particular event subscription, upon detecting a change in availability of the input information, causing, at least in part, transmission of an event template notification to the subscriber unit for informing the subscriber unit of the change in the availability of the input information.

38. A computer-readable storage medium carrying one or more sequences of one or more instructions which, when executed by one or more processors, cause an apparatus to at least perform the following steps:

establishing an event subscription and an associated event package template with an event server;

receiving from the event server an initial notify message indicating availability of input information needed to determine an event state for the event subscription; and in response to a change in availability of the input information, receiving an event template notification from the event server indicating the change in the availability of the input information.

\* \* \* \* \*